United States Patent [19]

Hikasa et al.

[11] Patent Number: 4,933,389

[45] Date of Patent: Jun. 12, 1990

[54] THERMOPLASTIC ELASTOMER COMPOSITION

[75] Inventors: Tadashi Hikasa; Koichiro Ibuki; Tatsuo Hamanaka; Masahiro Fukuyama, all of Chiba, Japan

[73] Assignee: Sumitomo Chemical Company, Limited, Osaka, Japan

[21] Appl. No.: 304,223

[22] Filed: Jan. 31, 1989

[30] Foreign Application Priority Data

Feb. 3, 1988 [JP] Japan .................. 63-24525

[51] Int. Cl.$^5$ .............. C08L 23/26; C08L 23/16; C08L 23/10; C08L 33/04

[52] U.S. Cl. ..................... 524/523; 524/522; 524/517; 525/194; 525/207; 525/208; 525/221; 525/227

[58] Field of Search ........... 525/208, 207, 221, 227, 525/194; 524/523, 517

[56] References Cited

U.S. PATENT DOCUMENTS

| | | | |
|---|---|---|---|
| 3,833,689 | 9/1974 | Usamoto et al. | 260/897 B |
| 3,849,333 | 11/1974 | Lloyd et al. | 252/511 |
| 3,915,929 | 10/1975 | Kishikawa et al. | 260/42.18 |
| 4,131,654 | 12/1978 | Herman et al. | 260/897 B |
| 4,212,787 | 7/1980 | Matsuda et al. | 525/211 |
| 4,332,655 | 6/1982 | Berejka | 525/192 |
| 4,379,888 | 4/1983 | Yoshimura et al. | 525/221 |
| 4,555,546 | 11/1985 | Patel | 525/194 |
| 4,649,487 | 1/1987 | Hazelton et al. | 524/425 |
| 4,696,967 | 9/1987 | Shedd et al. | 525/194 |
| 4,710,544 | 12/1987 | Wolfe | 525/194 |
| 4,758,629 | 7/1988 | Deyrup et al. | 525/208 |
| 4,775,722 | 10/1988 | Kobayashi et al. | 525/227 |
| 4,782,110 | 11/1988 | Wolfe | 525/221 |
| 4,820,774 | 4/1989 | Takao et al. | 525/227 |

FOREIGN PATENT DOCUMENTS

56-2332 1/1981 Japan .
62-290741 12/1987 Japan .

*Primary Examiner*—Carman J. Securro
*Attorney, Agent, or Firm*—Cushman, Darby & Cushman

[57] ABSTRACT

The present invention provides a thermoplastic elastomer composition excellent in oil resistance. This composition comprises a partially crosslinked mixture of (A) an ethylene copolymer rubber comprising ethylene and an acrylate ester or a methacrylate ester and (B) an olefin polymer and, if necessary, (C) an olefin copolymer rubber.

7 Claims, No Drawings

THERMOPLASTIC ELASTOMER COMPOSITION

BACKGROUND OF THE INVENTION

The present invention relates to a thermoplastic elastomer composition excellent in oil resistance. More particularly, it relates to an oil-resistant thermoplastic elastomer composition which comprises a dynamically crosslinked mixture of an ethylene copolymer rubber comprising ethylene and an acrylate or methacrylate ester and an olefin polymer at a specific ratio, or a dynamically crosslinked mixture of an ethylene copolymer rubber comprising ethylene and an acrylate or methacrylate ester, an olefin polymer and an olefin copolymer rubber comprising ethylene and α-olefin at a specific ratio.

Thermoplastic elastomers, which are hereinafter referred to as "TPEs", have been developed for various fields such as automobile parts, electric appliance parts and mechanical parts because of their characteristics that valcanizing step is not required in comparison with valcanized rubbers and they can be processed by ordinary molding machine for thermoplastic resins. Among them, olefin TPEs are known, for example, in Japanese Patent Kokai No. 48-26838, as being superior in balance of price and properties. Thus, their use has been developed.

Recently, however, with rapid progress of technique in various industries such as of automobile, electric appliance and machinery, the olefin TPE has been required to have various properties for various parts. Especially, due to less oil resistance from valcanized rubbers, the olefin TPE became unsatisfactory for a wide range of application.

In order to improve oil resistance, attempts have been made to increase crosslinking degree of olefin copolymer rubber in olefin TPE by increasing content of olefin polymer or adding inorganic filler.

However, even if oil resistance can be improved by decreasing content of olefin copolymer rubber or increasing crosslinking degree of the olefin copolymer rubber, this, in turn, causes reduction of flexibility, deterioration of compressive permanent set and decrease of flowability upon processing and thus it was difficult to obtain a TPE composition superior in balance of properties.

SUMMARY OF THE INVENTION

The object of the present invention is to provide a TPE composition which is improved in oil resistance while retaining a compressive permanent set of olefin TPE to the extent that no practical problem occurs.

The above object has been accomplished by a thermoplastic elastomer composition which comprises a partially crosslinked mixture comprising an ethylene copolymer rubber (A) comprising ethylene and an acrylate or methacrylate ester and an olefin polymer (B), or a partially crosslinked mixture comprising said ethylene copolymer rubber (A), said olefin polymer (B) and an olefin copolymer rubber (C).

DESCRIPTION OF THE INVENTION

The present invention will be explained below in detail.

(1) The components of the ethylene copolymer rubber (A) are (a) ethylene and (b) an acrylate or methacrylate ester. The acrylate or methacrylate ester (b) is an ester with an alcohol of 1-8 carbon atoms. Examples of (b) are methyl acrylate, methyl methacrylate, ethyl acrylate, ethyl methacrylate, butyl acrylate, butyl methacrylate, tert-butyl acrylate, tert-butyl methacrylate, 2-ethylhexyl acrylate and 2-ethylhexyl methacrylate. These may be used alone or in combination of two or more.

Molar ratio of ethylene (a) to acrylate or methacrylate ester (b) is 50-85:50-15, preferably 58-80:42-20.

When content of acrylate or methacrylate ester (b) is more than 50 mol %, the resultant elastomer is difficult to use at low temperature as its embrittlement point increases. When it is less than 15 mol %, sufficient elasticity as elastomer or copolymer cannot be obtained.

The ethylene copolymer rubber (A) may be copolymerized with at least one of unsaturated glycidyl esters, acid anhydrides, unsaturated compounds having carboxylic acid group and the like (hereinafter referred to as "third component").

Examples of the unsaturated glycidyl esters are glycidyl acrylate, glycidyl methacrylate, diglycidyl itaconate, triglycidyl butenetricarboxylate and glycidyl p-styrenecarboxylate which are disclosed in Japanese Patent Kokoku No. 46-45085.

Examples of the unsaturated compounds containing carboxylic acid group are acrylic acid, methacrylic acid, maleic acid and half esters of maleic acid.

Example of the acid anhydrides is maleic anhydride.

Amount of the third component is 0.05-5 mol %, preferably 0.1-3 mol % per sum of components (a) and (b).

It is also possible to copolymerize the ethylene copolymer rubber (A) with other comonomers copolymerizable with ethylene. Examples of these comonomers are isobutylene, styrene and derivatives thereof, vinyl acetate and hydrogenated olefins such as tetrafluoroethylene and hexafluoropropylene.

The ethylene copolymer rubber (A) can be prepared by known processes such as free-radical initiated bulk polymerization, emulsion polymerization and solution polymerization. A typical polymerization process is disclosed in Japanese Patent Kokoku No. 46-45085. For example, it can be prepared under the polymerization conditions of pressure of at least 500 kg/cm$^2$ and a temperature of 40°-300° C. in the presence of a polymerization initiator which produces free radical.

The ethylene copolymer rubber (A) used in the present invention which is prepared by copolymerization of the above-mentioned components has a melt index as specified by JIS K6791 of 0.5-500 g/10 min, preferably 0.5-50 g/10 min at 190° C.

(2) The olefin polymer (B) used in the present invention is a polypropylene or a copolymer of propylene with α-olefin of 2 or more carbon atoms. Examples of the α-olefin having 2 or more carbon atoms are ethylene, 1-butene, 1-pentene, 3-methyl-1-butene, 1-hexene, 1-decene, 3-methyl-1-pentene, 4-methyl-1-pentene and 1-octene.

These polymers have a melt index of 0.1-100 g/10 min, preferably 0.5-50 g/10 min. When melt index is lower than 0.1 g/10 min or is higher than 100 g/10 min, problems occur in processability.

(3) The olefin copolymer rubber (C) used in the present invention is an amorphous and random elastic copolymer mainly composed of olefin such as ethylene-propylene copolymer rubber, ethylenepropylene-non-conjugated diene rubber, ethylene-butene-non-conjugated diene rubber and propylene-butadiene copolymer rubber. Among them, ethylene-propylene-non-conjugated diene rubber is especially preferred. The non-conjugated diene includes dicyclopentadiene, 1,4-hexadiene, cyclooctadiene, methylene norbornene and ethylidene norbornene. Ethylidene norbornene is especially preferred.

More typical example is an ethylenepropylene-ethylidene norbornene copolymer rubber, referred to as ▸EPDM" hereinafter, which comprises a propylene content of 10–55% by weight, preferably 20–40% by weight and an ethylidene norbornene content of 1–30% by weight, preferably 3–20% by weight and has a Mooney viscosity at 100° C. [$ML_{1+4}$ (100° C.)] of 50–350, preferably 150–300.

When propylene content is lower than 10% by weight, flexibility is lost and when it is higher than 55% by weight, mechanical characteristics deteriorate. When ethylidene norbornene content is lower than 1% by weight, mechanical characteristics deteriorate and when it is higher than 30% by weight, injection moldability is inferior. When Mooney viscosity at 100° C. [$ML_{1+4}$ (100° C.)] is lower than 50, mechanical characteristics are lost and when it is higher than 350, appearance of molded products is damaged.

EPDM may be produced by known processes.

An oil-extended olefin copolymer rubber, referred to as "oil-extended EPDM" hereinafter, may be used as the component (C). The oil-extended EPDM contains a mineral oil type softening agent in an amount of 150 parts by weight or less, preferably 120 parts by weight or less per 100 parts of EPDM. When content of the softening agent is more than 150 parts by weight, deterioration in processability or properties is significant. Besides, bleeding of the softening agent occurs on the surface of composition resulting in stain and sticking of products.

Oil extension of EPDM can be performed by known methods. For example, oil extended EPDM can be obtained by adding a predetermined amount of a mineral oil type softening agent to an EPDM solution and then removing solvent by such a method as steam stripping. EPDM solution obtained by polymerization is easier in operation.

(4) Compositional ratio (% by weight) of ethylene copolymer rubber (A) to olefin polymer (B) in the olefin TPE composition of the present invention is 40–95-:5–60, preferably 50–90:10–50. When amount of ethylene copolymer rubber (A) is less than 40% by weight, hardness increases and when it is more than 95% by weight, moldability deteriorates.

In case of a mixture comprising the above (A) and (B) and additionally the olefin copolymer rubber (C), the ratio (% by weight) of (A), (B) and (C) is 5–90:5–60-:5–85, preferably 10–80:10–50:10–80. When content of ethylene copolymer rubber (A) is less than 5% by weight, effect to improve oil resistance is poor and when it is more than 90% by weight, moldability deteriorates When content of olefin polymer (B) is less than 5% by weight flowability reduces resulting in inferior appearance of molded products and when it is more than 60% by weight, flexibility decreases. When content of olefin copolymer rubber (C) is more than 85% by weight, oil resistance decreases to cause deterioration of compressive permanent set and hence olefin copolymer rubber (C) is used generally in an amount of 80% by weight or less.

(5) As organic peroxides for partially crosslinking the mixture of (A) and (B) or (A), (B) and (C), mention may be made of 2,5-dimethyl-2,5-di(t-butylperoxy)hexane, 2,5-dimethyl-2,5-di(t-butylperoxy) hexyne-3,1,3-bis(t-butylperoxyisopropyl) benzene, 1,1-di(t-butylperoxy) 3,5,5-trimethylcyclohexane, 2,5-dimethyl-2,5-di(-peroxybenzoyl) hexyne-3 and dicumyl peroxide Among them, 2,5-dimethyl-2,5-di(t-butylperoxy) hexane is especially preferred from the point of smell and scorch.

Amount of the organic peroxide can be 0.03–2.0 parts by weight per 100 parts by weight of total amount of (A) and (B) or (A), (B) and (C). If the amount is less than 0.03 part by weight, effect on crosslinking reaction is small and if it is more than 2.0 parts by weight, it is difficult to control the reaction and besides such amount is not economical.

(6) A crosslinking aid can be added at the time of crosslinking in preparation of the present composition. Examples of the crosslinking aid are peroxide crosslinking aids such as N,N'-m-phenylenebismaleimide, toluylenebismaleimide, p-quinonedioxime, nitrobenzene, diphenylguanidine and trimethylolpropane and polyfunctional vinyl monomers such as divinylbenzene, ethylene glycol dimethacrylate, polyethylene glycol dimethacrylate, trimethylolpropane trimethacrylate and allyl methacrylate. Addition of such compound brings about homogeneous and gentle crosslinking reaction and a reaction between (A) and (B) or among (A), (B) and (C) and thus mechanical characteristics can be improved.

Amount of the peroxide crosslinking aid or the polyfunctional vinyl monomer added can be 0.01–4.0 parts by weight, preferably 0.05–2.0 parts by weight per 100 parts by weight of total amount of (A) and (B) or (A), (B) and (C). If the amount is less than 0.01 part by weight, the effect is not sufficiently exhibited and more than 4 parts by weight is not economical.

(7) A typical process for producing TPE composition by partial crosslinking of a mixture of (A) and (B) or (A), (B) and (C) will be explained below.

To a mixture of ethylene copolymer rubber (A) and olefin polymer (B) or a mixture of ethylene copolymer rubber (A), olefin polymer (B) and olefin copolymer rubber (C) are added an organic peroxide and, if necessary, a crosslinking aid at a specific ratio and the resulting mixture is dynamically heat-treated, namely, melted and kneaded. Known nonopen Banbury mixer, twin-screw extruder, etc. are used as kneading apparatuses. Kneading may be carried out at 150°–300° C. for about 1–30 minutes. In preparation of this composition, if necessary, there may be further added auxiliary materials such as inorganic filler, antioxidant, weathering agent, antistatic agent, softening agent and coloring pigment.

Preferred method for mixing and kneading ethylene copolymer rubber (A), olefin polymer (B), olefin copolymer rubber (C), organic peroxide and other materials is as follows: A mixture of ethylene copolymer rubber (A), an oil-extended olefin copolymer rubber comprising olefin copolymer rubber (C) and a mineral oil softening agent and olefin polymer (B) and, if necessary, a crosslinking aid and auxiliary materials blended at a specific ratio is sufficiently kneaded and homogenized at 150°–250° C. by a known non-open type kneader such as Banbury mixer, and then the resulting composition is blended with an organic peroxide by an enclosed mixer such as tumbler or super mixer. Thereafter, the blend is dynamically heat-treated at 200°–300° C. by a twin-screw continuous extruder which can afford strong kneading power.

The auxiliary materials can be added at any stages of production of the present composition or at processing step or at the time of using the product after processing.

The following non-limiting examples will explain the present invention in more detail.

EXAMPLES 1-7 and Comparative Examples 1-5

The components as shown in Tables 1 and 2 (in part by weight) were kneaded by Banbury mixer at 170°-190° C. for 7 minutes and then a pelletized master batch was prepared therefrom using an extruder.

Then, this master batch was uniformly blended with an organic peroxide Sanperox® (manufactured by Sanken Kako Co.) at a ratio as shown in Table 1 for 10 minutes by Henschel mixer.

The resulting blend was subjected to dynamic heat treatment at 250° C.±10° C. for 70 seconds by a twin-screw extruder (Tex 44 manufactured by Nippon Seikosho Co.) which can give a strong kneading power, and was pelletized to obtain a thermoplastic elastomer.

A sample for measuring oil resistance was prepared by cutting out a test piece of 20 mm×20 mm×2 mm from a plate obtained by molding the above pelletized thermoplastic elastomer by an injection molding machine (Model FS-75N manufactured by Nissei Jushi Co.) under the following molding conditions: Molding temperature: 220° C.; Mold temperature: 50° C.; Injection: 10 seconds; Cooling: 30 seconds; Injection pressure: minimum filling pressure necessary for complete filling in the mold plus 2.5 kg/cm²; Shape of mold: 150 mm×90 mm×2 mm with a pin gate.

Oil resistance was evaluated by measuring weight change after 22 hours at 70° C. in accordance with JI K-6301 using JIS No. 1 oil and JIS No. 3 oil.

Compressive permanent set (c. set (%)) was evaluated in accordance with JIS K-6301 at a strain of 25% at 70° C. for 22 hours. Instantaneous value of Shore hardness A was employed as hardness.

TABLE 1

| | | Example No. | | | | | | |
|---|---|---|---|---|---|---|---|---|
| | | 1 | 2 | 3 | 4 | 5 | 6 | 7 |
| Components | Ethylene copolymer rubber (A) (*1) | 80 | 80 | 80 | 10 | 15 | 30 | 30 |
| | Olefin polymer (B) (*2) | 20 | | | | | | 10 |
| | Olefin polymer (B) (*3) | | 20 | 20 | 15 | 10 | 10 | |
| | Olefin copolymer rubber (C) (*4) | | | | | | | |
| | Olefin copolymer rubber (c) (*5) | | | | 75 | 75 | 60 | 60 |
| | Softening agent (*6) | | | 20 | | | | |
| | Crosslinking aid (*7) | 1.5 | 3 | 2 | 1.5 | 1.5 | 2 | 2 |
| | Organic peroxide (*8) | 0.3 | 1 | 0.3 | 0.8 | 0.8 | 0.8 | 0.8 |
| Properties | Oil resistance (Oil No. 1) | 6 | 6 | 8 | 26 | 28 | 22 | 23 |
| | Oil resistance (Oil No. 3) | 35 | 33 | 40 | 120 | 125 | 112 | 115 |
| | C. Set (%) | 48 | 44 | 41 | 32 | 33 | 33 | 35 |
| | Hardness | 76 | 80 | 70 | 63 | 60 | 57 | 55 |

TABLE 2

| | | Comparative Example No. | | | | |
|---|---|---|---|---|---|---|
| | | 1 | 2 | 3 | 4 | 5 |
| Components | Ethylene copolymer rubber (A) (*1) | | | | | |
| | Olefin polymer (B) (*2) | 20 | | | | |
| | Olefin polymer (B) (*3) | | 20 | 20 | 30 | 20 |
| | Olefin copolymer rubber (C) (*4) | | | | 70 | 80 |
| | Olefin copolymer rubber (C) (*5) | 80 | 80 | 80 | | |
| | Softening agent (*6) | | | | | |
| | Crosslinking aid (*7) | | 3 | 1 | | 2 |
| | Organic peroxide (*8) | 0.3 | 1 | 0.3 | 1 | 0.8 |
| Properties | Oil resistance (Oil No. 1) | 48 | 43 | 44 | 55 | 60 |
| | Oil resistance (Oil No. 3) | 160 | 145 | 150 | 182 | 205 |
| | C. Set (%) | 45 | 31 | 32 | 50 | 39 |

TABLE 2-continued

|  | Comparative Example No. | | | | |
| --- | --- | --- | --- | --- | --- |
|  | 1 | 2 | 3 | 4 | 5 |
| Hardness | 67 | 71 | 69 | 90 | 75 |

(*1): Ethylene copolymer rubber (A):
Ethylene/methyl acrylate (weight ratio) = 47/53
$ML_{1+4}(100°\ C.) = 21$
Melt index (190° C., 2.16 kg) = 3.0 g/10 min.
(*2): Olefin polymer (B):
Random type polypropylene "Sumitomo Noblen Z-131 ®" manufactured by Sumitomo Chemical Co. Ltd.
(*3): Olefin polymer (B):
Homopropylene "Sumitomo Noblen FL8013 ®" manufactured by Sumitomo Chemical Co. Ltd.
(*4): Olefin copolymer rubber (C):
Ethylene/propylene (weight ratio) = 50/50
Amount of dicyclopentadiene (iodine value = 8)
$ML_{1+4}(121°\ C.) = 60$
(*5): Olefin copolymer rubber (C):
Ethylene/propylene (weight ratio) = 72/28
Amount of ethylidene norbornene (iodine value = 12)
Amount of mineral oil type softening agent = 50% by weight,
$ML_{1+4}(100°\ C.) = 53$
(*6): Softening agent:
"Adekasizer RS-700 ®" manufactired by Adeka Argus Co.
(*7): Crosslinking aid:
"Sumifine BM ®" manufactured by Sumitomo Chemical Co. Ltd.
(*8): Organic peroxide:
"Sanperox APO ®" manufactured by Sanken Kako Co.

As explained hereabove, the present invention provides a thermoplastic elastomer which is improved in oil resistance with retaining flexibility and compressive permanent set. The thermoplastic elastomer can be used for materials in engine room of automobiles which require oil resistance.

We claim:

1. A thermoplastic elastomer composition which comprises a partially crosslinked mixture of (A) an ethylene copolymer rubber comprising ethylene and an acrylate ester or a methacrylate ester, at least one olefin polymer selected from a polypropylene and a propylene/α-olefin copolymer, and (C) an α-olefin copolymer rubber which is either (i) ethyleneα- olefin copolymer rubber or (ii) ethyleneα-olefin/nonconjugated diene copolymer rubber, wherein molar ratio of said ethylene to said acrylate ester of methacrylate ester in the ethylene copolymer rubber (A) is 50–85:50:15.

2. A composition according to claim 1 wherein content of ethylene copolymer rubber (A) is 5–90% by weight, that of olefin polymer (B) is 5–60% by weight and that of olefin copolymer rubber (C) is 5–85% by weight.

3. A composition according to claim 1 wherein the ethylene copolymer rubber (A) additionally contains at least one of unsaturated glycidyl ester, acid anhydride and unsaturated compound containing carboxylic acid group.

4. A composition according to claim 1 wherein the ethylene copolymer rubber (A) additionally contains other comonomers copolymerizable with ethylene.

5. A composition according to claim 1 wherein the olefin copolymer rubber (C) is an ethylene-propylene-non-conjugated diene rubber.

6. A composition according to claim 1 wherein the olefin copolymer rubber (C) is an oil-extended olefin copolymer rubber containing 150 parts by weight or less of a mineral oil type softening agent per 100 parts by weight of the olefin copolymer rubber.

7. A process for producing a thermoplastic elastomer composition which comprises mixing (A) an ethylene copolymer rubber comprising ethylene and an acrylate ester or a methacrylate ester, (B) at least one olefin polymer selected from a polypropylene and a propyleneα-olefin copolymer, and (C) an olefin copolymer rubber which is either (i) ethyleneα-olefin copolymer rubber or (ii) ethyleneα-olefin/nonconjugated diene copolymer rubber and an organic peroxide, and dynamically heat-treating the mixture, wherein molar ratio of said ethylene to said acrylatae ester or methacrylate ester in the ethylene copolymer ruber (a) is 50–85:-50–15.

* * * * *

UNITED STATES PATENT AND TRADEMARK OFFICE
CERTIFICATE OF CORRECTION

PATENT NO. : 4,933,389

DATED : June 12, 1990

INVENTOR(S) : HIKASA et al

It is certified that error appears in the above-identified patent and that said Letters Patent is hereby corrected as shown below:

```
Column 7, line 34, insert --(B)-- before "at";
Column 7, line 36, delete "α-" (second occurance);
Column 7, line 37, insert --/-- before "α";
Column 7, line 38, insert --/-- before "α";
Column 7, line 40, replace "of" with --or--;
Column 7, line 41, replace ":" (second occurance) with "-";
Column 8, line 41, insert --/-- before "α";
Column 8, line 42, insert --/-- before "α";
Column 8, line 43, insert --/-- before "α";
Column 8, line 46, replace "acrylatae" with --acrylate--;
Column 8, line 47, replace "ruber" with --rubber--;
         line 47, replace "(a)" with --(A)--.
```

Signed and Sealed this

Thirty-first Day of December, 1991

*Attest:*

HARRY F. MANBECK, JR.

*Attesting Officer*  *Commissioner of Patents and Trademarks*